(12) United States Patent
McCoy et al.

(10) Patent No.: US 8,438,549 B1
(45) Date of Patent: May 7, 2013

(54) DATA PROCESSING WITH MICROCODE DESIGNED WITH SOURCE CODING

(75) Inventors: James A. McCoy, Albuquerque, NM (US); Steven E. Morrison, Albuquerque, NM (US)

(73) Assignee: Sandia Corporation

( * ) Notice: Subject to any disclaimer, the term of this patent is extended or adjusted under 35 U.S.C. 154(b) by 904 days.

(21) Appl. No.: 12/559,681

(22) Filed: Sep. 15, 2009

(51) Int. Cl.
*G06F 9/45* (2006.01)

(52) U.S. Cl.
USPC ........... 717/139; 717/118; 717/136; 717/137; 717/140

(58) Field of Classification Search ................. 717/139, 717/140
See application file for complete search history.

(56) References Cited

U.S. PATENT DOCUMENTS

| | | | | |
|---|---|---|---|---|
| 4,493,027 A | * | 1/1985 | Katz et al. ....................... | 712/228 |
| 4,556,938 A | * | 12/1985 | Parker et al. ................... | 712/241 |
| 5,577,259 A | * | 11/1996 | Alferness et al. ............... | 712/41 |
| 6,003,038 A | * | 12/1999 | Chen ................................ | 1/1 |
| 6,172,990 B1 | * | 1/2001 | Deb et al. ....................... | 370/474 |
| 6,446,192 B1 | * | 9/2002 | Narasimhan et al. ........... | 712/29 |
| 6,675,289 B1 | * | 1/2004 | Eslick et al. ................... | 712/226 |
| 6,775,763 B2 | | 8/2004 | Sexton et al. | |
| 7,103,759 B1 | * | 9/2006 | Blixt .............................. | 712/248 |
| 7,523,157 B2 | * | 4/2009 | Aguilar et al. ................. | 709/202 |
| 7,533,365 B1 | * | 5/2009 | Hogstrom et al. ............. | 717/105 |
| 7,747,989 B1 | * | 6/2010 | Kissell .......................... | 717/148 |
| 7,805,344 B2 | * | 9/2010 | Smith .............................. | 705/35 |
| 8,154,554 B1 | * | 4/2012 | Brown et al. .................. | 345/522 |
| 8,214,339 B2 | * | 7/2012 | Breeds et al. .................. | 707/701 |
| 8,219,981 B2 | * | 7/2012 | Aguilar et al. ................. | 717/149 |
| 2003/0046358 A1 | * | 3/2003 | Johnson et al. ............... | 709/216 |
| 2004/0073899 A1 | * | 4/2004 | Luk et al. ...................... | 717/158 |
| 2005/0246269 A1 | * | 11/2005 | Smith .............................. | 705/39 |
| 2009/0222921 A1 | * | 9/2009 | Mukhopadhyay et al. ..... | 726/23 |
| 2010/0199257 A1 | * | 8/2010 | Biggerstaff ................... | 717/104 |
| 2010/0333078 A1 | * | 12/2010 | Sun et al. ...................... | 717/145 |

OTHER PUBLICATIONS

Title: An Inter-Classes Obfuscation Method for Java Program, autho: Xuesong Zhang, dated: Apr. 26, 2008, source: IEEE.*
Title: An environment for the development of microcode for pipelined architectures, author: Nicolau, et al, source: IEEE, dated: 1992.*
McCoy, "An Embedded System for Safe, Secure and Reliable Execution of High Consequence Software" Proceedings, Fifth IEEE International Symposium on High Assurance Systems Engineering (HASE 2000): Nov. 15-17, 2000, Albuquerque, New Mexico, pp. 107-114.
Schoberl, "JOP: A Java-Optimized Processor for Embedded Real-Time Systems", Dissertation, Technischen UniversitatWien, 2005, pp. 55-119.

* cited by examiner

*Primary Examiner* — Chameli Das
(74) *Attorney, Agent, or Firm* — Michael A. Beckett

(57) ABSTRACT

Programming for a data processor to execute a data processing application is provided using microcode source code. The microcode source code is assembled to produce microcode that includes digital microcode instructions with which to signal the data processor to execute the data processing application.

20 Claims, 5 Drawing Sheets

DATA PROCESSING WITH MICROCODE DESIGNED WITH SOURCE CODING

This invention was developed under Contract DE-AC04-94AL85000 between Sandia Corporation and the U.S. Department of Energy. The U.S. Government has certain rights in this invention.

FIELD OF THE INVENTION

The invention relates generally to data processing and, more particularly, to data processing using microcode techniques.

BACKGROUND OF THE INVENTION

A significant gap exists between high level, object-oriented software and the hardware that it runs on. Current microprocessors do not have any mechanisms to protect against significant errors that occur in software programs, for example, array out-of-bounds accesses, attempts to dereference a null pointer, and use of un-initialized variables. Errors such as these account for the majority of security faults that exist in both commercial and non commercial software applications. The effort to avoid making these errors, as well as the effort required to find and fix them once they occur, creates a huge productivity drain.

It is therefore desirable to provide for improved capability to avoid errors such as those described above.

DETAILED DESCRIPTION

Figure 1:
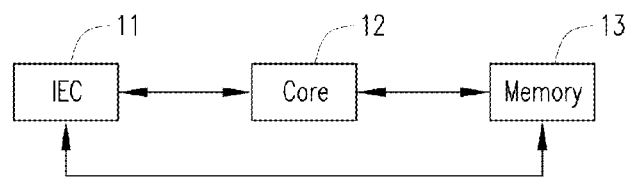
FIG. 1 diagrammatically illustrates a data processing apparatus according to exemplary embodiments of the invention.

FIG. 1 diagrammatically illustrates a data processing apparatus according to exemplary embodiments of the invention. In some embodiments, the data processing apparatus is provided as a single integrated circuit. A data processing core 12 executes data processing operations under control of microcode instructions provided by an instruction execution controller (IEC) 11. Under control of a suitable clock signal (not explicitly shown in FIG. 1), the IEC 11 fetches from a memory arrangement 13 binary representations of source code instructions (e.g., JAVA™ bytecodes). In response to the information fetched from the memory arrangement 13 during each clock cycle, the IEC 11 outputs a microcode instruction that controls operations of the core 12, including internal data processing operations of the core 12, and operations of the core's interface with the memory arrangement 13. The IEC 11 may also use information received from the core 12 and the memory arrangement 13 to produce microcode instructions for output to the core 12.

Figure 2:
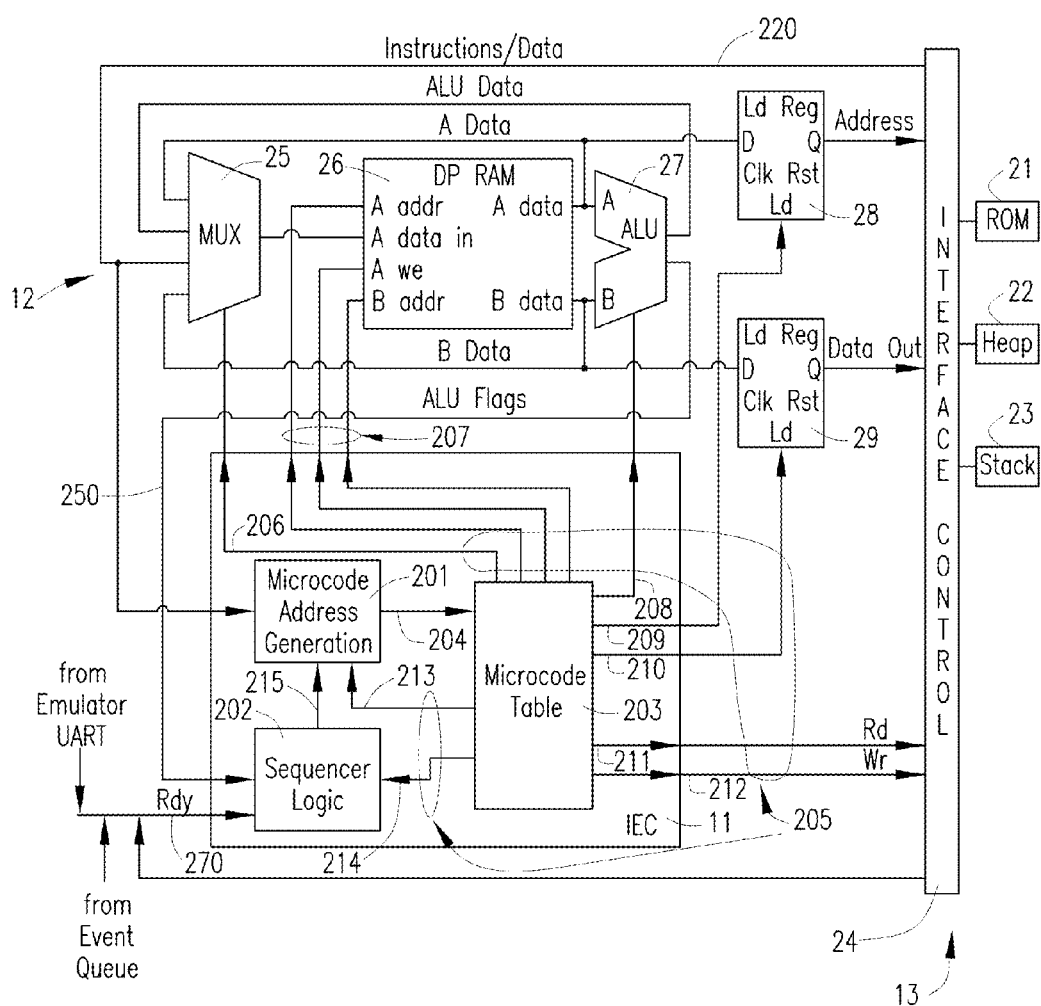
FIG. 2 diagrammatically illustrates the apparatus of FIG. 1 in more detail according to exemplary embodiments of the invention.

FIG. 2 diagrammatically illustrates the data processing apparatus of FIG. 1 in more detail according to exemplary embodiments of the invention. The memory arrangement 13 includes a program ROM portion 21, a heap portion 22, a stack portion 23, and a memory interface controller 24. The data processing core 12 includes a multiplexer portion 25, a RAM portion 26, an arithmetic logic unit (ALU) portion 27, an address register portion 28, and a data register portion 29. The IEC 11 includes a microcode address generator portion 201, a sequencer logic portion 202, and a microcode table portion 203. The microcode address generator portion 201 generates an address 204 that selects a microcode instruction stored in the microcode table portion 203 (implemented by a suitable digital storage memory). The microcode table portion 203 outputs the selected microcode instruction (designated generally at 205) in response to the address 204. This microcode instruction controls the data processing operation of the core 12, and its communication with the memory arrangement 13.

The microcode instruction 205 includes fields 206, 207, 208, 209 and 210 that respectively control the multiplexer portion 25, the RAM portion 26, the ALU portion 27, the address register portion 28, and the data register portion 29. The microcode instruction 205 further includes fields 211 and 212 that provide requests for reading from (211) and writing to (212) the memory arrangement 13. The microcode instruction 205 further includes a field 213 that provides branch address information to the microcode address generator portion 201, and a field 214 that provides control information to the sequencer logic portion (also referred to as the sequencer) 202.

In some embodiments, the RAM portion 26 is a dual port (DP) RAM having an A data input driven by the output of the multiplexer portion 25, and having A and B data outputs that drive respective inputs of the ALU portion 27. The A and B data outputs also respectively drive the inputs of the address register portion 28 and the data register portion 29, whose outputs respectively provide address and data inputs to the memory interface controller 24. The A and B data outputs also drive respective inputs of the multiplexer portion 25, and ALU data that is output by the ALU portion 27 is provided to another input of the multiplexer portion 25. ALU flags indicative of conditions in the ALU portion 27 are output at 250 by the ALU portion 27 to the sequencer logic portion 202. At 220, the memory interface controller 24 provides instructions from the ROM portion 21, and data from the heap and stack portions 22 and 23, to an input of the multiplexer portion 25. The instruction/data information at 220 is also provided to an input of the microcode address generation portion 201. The memory interface controller 24 also provides "ready" signals at an input (Rdy) 270 of the sequencer logic portion 202 when requested instruction or data information is available from the memory portion 13. The Rdy input 270 receives further "ready" signals from an event queue and an emulator UART. The microcode instruction fields at 207 provide addresses for the A data and B data in the RAM portion 26, as well as a write enable signal (we) that controls storage of A data in the RAM portion 26. The sequencer logic portion 202 provides control signaling 215 for the microcode address generation portion 201.

The general architecture of the data processing core 12, including elements 25-29 as shown in FIG. 2 and described above, is well known in the art. Various embodiments use various ALU architectures for the ALU portion 27 (depending of course on the data processing requirements of the embodiment), together with various suitable sets of signals in microcode instruction field 208 to control operation of the ALU portion 27. Similarly, in various embodiments, the ALU portion 27 provides various combinations of ALU flags to the sequencer logic portion 202.

Figure 3:
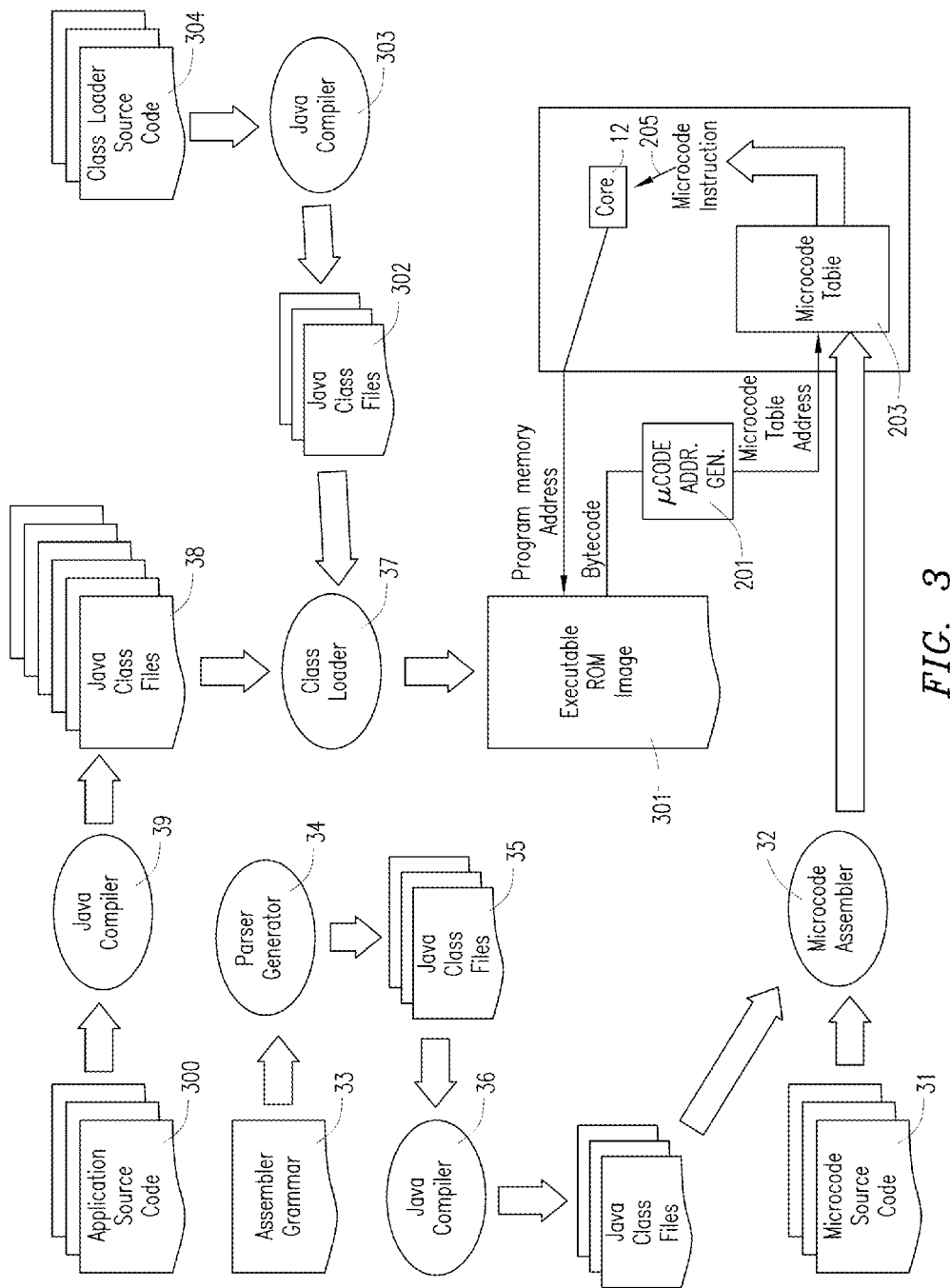
FIG. 3 diagrammatically illustrates development tools for developing portions of the data processing apparatus of FIGS. 1 and 2.

Exemplary embodiments of the invention permit the microcode in microcode table 203 to be developed using a high-level source language, rather than literally coding the 1s and 0s in each field of each microcode instruction. An example of this is illustrated in FIG. 3, which illustrates development tools supported by a suitable development system. In FIG. 3, a microcode assembler 32 assembles high-level source code 31 to produce the microcode instructions of the microcode table 203. The high-level source code 31 (also referred to herein as the microcode source code) is written in a language referred to herein as microcode assembly language. Assembler grammar 33 provides a formal description of the syntax of the microcode assembly language. A parser generator 34 uses conventional techniques to produce assembler source code 35 in response to the assembler grammar 33. In some embodiments, the parser generator 34 is the commercially available product known as JAVA™CC. In some embodiments, the assembler source code 35 is JAVA™ source code, as shown in the example of FIG. 3. The assembler source code 35 is compiled at 36 (by a JAVA™ compiler in the example of FIG. 3) to produce the microcode assembler 32, which is capable of parsing the microcode assembly language used to produce the microcode source code 31.

In some embodiments, the microcode assembly language syntax defined by the assembler grammar requires the microcode source code to be self-defining, which means that the microcode assembler has no built-in knowledge of the functions that the microcode will implement in conjunction with the data processor portion. An example of the assembler grammar used in some embodiments is provided in Appendix I. Appendix II provides a description of the microcode assembly language syntax associated with the assembler grammar of Appendix I. The self-defining microcode source code, written in the microcode assembly language, declares all of the information that the microcode assembler 32 needs to implement all functions defined by the microcode source code. Accordingly, the self-defining microcode source code is composed according to the following ordered process:

(1) Declare the types, the width of each type, and the type values associated with each type. The first type value declared for a type is a default value.
(2) Declare the fields. Each field (i.e., each constituent set of binary data within a microcode instruction) is declared to be of a specific type, so the width of each field is known, as are the legal (type) values that can be assigned to that field.
(3) Declare basic operations associated with the architecture of the data processor portion. In this connection, the microcode table is conceptualized as an "operation" construct, which is the basic building block of the microcode. Each operation results in exactly one line of microcode (i.e., one microcode instruction) in the microcode table. An operation declaration defines the values that each field should take for a particular microcode instruction. As will be seen below, the user can define functions that are more complex by combining operations using "instructions" and "macros" defined in the microcode assembly language (a) Each operation defines the values that need to be assigned to each field for that operation. Every field is assigned a value, but most of the fields just get their default value. Each operation is unique because a small number of the fields hold specific values other than their default values for that operation. These specific values cause data to move from one place to another, or cause some kind of arithmetic or logical function to be implemented with respect to the data. Operations can be thought of as basic or "atomic" activities, because they involve movement of data along a single, unique data path. Operations typically do not exploit any parallelism available in the architecture.

(b) In some embodiments, operations begin and end on synchronous elements. Although an operation can utilize asynchronous elements in intermediate capacities, for example, to steer or transform the data, the operation is completed as soon as the data reaches a synchronous element. A simple example of a synchronous element is a register. Synchronous elements are said to define a temporal boundary of an operation because, once the data reaches a synchronous element, the operation is complete, and nothing further can be done with respect to the data until the next clock cycle. Any operation therefore is bounded by two synchronous elements. The operation's data path starts at the output of one of the synchronous elements and ends at the input to the other synchronous element. Data flows along the path in a single clock cycle. As such, operations embody the temporal boundaries of the architecture. For example, in an operation that moves data from a source register to a destination register, perhaps with a multiplexer between them, the two temporal boundaries that define this operation are the output of the source register and the input of the destination register. The operation would define two non-default fields: one that sets the value for the select input of the multiplexer (to steer the correct multiplexer input to the multiplexer output), and the write enable for the destination register.

(c) An operation can specify the following kinds of field assignments:
  (i) a constant assignment. This means that every time the operation is used, any field with a constant assignment will always get the specified constant value.
  (ii) a variable assignment. This means that the value assigned to the field is not known until the operation is used in the microcode source code, at which time the developer provides the actual value to assign to the field. It is therefore possible for the field to have a different value each time the operation is used. Another way to think about this is that the variable assignment capability permits reusing the same named thing in slightly different ways. For example, a single operation can be used to store each of the multiplexer inputs to any of the DP RAM locations by defining both the multiplexer select and the A address as variables. The alternative would be to have a unique operation (name) for each combination of multiplexer inputs and DP RAM locations (hundreds of operations). This seemingly simple abstraction makes writing microcode much easier with fewer errors. This same concept is carried through to instructions and macros as well.
  (iii) a default assignment. Any field that is not specified as a constant or by a variable assignment gets its default value (see (1) above). Accordingly, when an operation is used, only the value(s) of the variable field(s) need to be specified. The values of all other fields are known, because they are either constant assignment fields or default assignment fields. Here again this simple abstraction makes writing and maintaining the microcode much easier and less error prone by relieving the programmer from responsibility for a large portion of the microcode complexity, and pushing that responsibility onto the development tool. In Software Engineering terminology this is referred to as minimizing the coupling of operations in the microcode. Striving for loose coupling means that changes in one area are much less likely to have repercussions in another unrelated area.

(4) In some embodiments, the microcode assembly language is used to define instructions (in the syntax of Appendix 1, the keyword is instr). Such instructions are to be distinguished from the microcode instructions in the microcode table 203. To help identify this distinction, the instructions that the microcode developer defines using the microcode assembly language are referred to herein simply as instructions, whereas the instructions in the microcode table are referred to herein as microcode instructions. An instruction provides a way to take advantage of any parallelism that exists in the architecture. Its syntax allows the developer to combine two or more mutually exclusive operations that occur in the same clock cycle. When defining an instruction, the developer can either specify appropriate values for variable fields in the operations, or maintain those fields as variable. When the instruction is used in the microcode source code, any variable assignment fields must then be specified. The following rules apply to the definition of instructions:

(a) All of the operations that are to be combined in the instruction must comply with the requirement specified in (3)(b) above.

(b) The operations to be combined must be mutually exclusive.

That is, the resources they use to move or operate on the data cannot overlap.

(5) In some embodiments, the microcode assembly language is used to define macros. A macro provides a way to group operations, instructions, and/or other macros and provide that grouping with a meaningful name. When defining a macro, as when defining an instruction, the developer can specify the values for any variable assignment fields, or maintain those fields as variable in the macro. When the macro is used in the microcode source code, any variable assignment fields must then be specified. A macro corresponds to one or more clock cycles—one if it only contains a single operation or instruction, more if there are multiple operations and/or instructions.

(6) After the types, fields, and operations (and instructions and/or macros in some embodiments) have been defined, the microcode assembly language is used to write a microcode source code program. This means creating an ordered sequence of operations and/or instructions and/or macros that has some meaning to the developer. For example, in some embodiments, the microcode instructions in the microcode table are used to implement a JAVA™ Virtual Machine (JVM), as described in more detail hereinbelow. The microcode source code program thus uses operations/instructions/macros to define the nature of how a JVM works, that is, how bytecodes from the JAVA™ specification are fetched and executed. This is achieved by using the microcode assembly language to define operations/instructions/macros that implement the functionality of the JVM. Any remaining variable fields are assigned appropriate type values to cause the operation/instruction/macro to behave as desired to support the JVM functionality. As a result, and as described in more detail hereinbelow, the microcode instructions in the microcode table essentially fetch and execute JAVA™ bytecodes.

Some examples of operations that can be defined using the microcode assembly language of Appendix II include:
loadStackAddr(% reg)
loadStackData(% reg)
readStack( )
writeStack( )
decrementReg(% reg)
incrementReg(% reg)
writeReg(% muxSelect, % reg)
loadALU(% regA, % regB)
aluOp(% op)
writeALUResult(% reg)

As an illustrative example of how the foregoing operations can be used to implement a JAVA™ bytecode, consider the iadd bytecode. For this bytecode, the JAVA™ specification requires popping the top two values from the JAVA™ operand stack, adding them together, and pushing the result back onto the top of the stack. To this end, the following macros are defined using various ones of the foregoing operations:

macro pop(
   loadStackAddr(SP)
   readStack( )
   writeReg(STACK, % reg)
   decrementReg(SP)
)
macro push(
   incrementReg(SP)
   loadStackAddr(SP)
   loadStackData(% reg)
   writeStack( )
)
macro add(
   loadALU(% regA, % regB)
   aluOp(ADD)
   writeALUResult(% reg)
)

Each line of each macro is also an operation. The pop macro can be described with respect to FIG. 2 as follows: move the value at a location referred to as SP in the RAM 26 of FIG. 2 to the Address Register 28; assert the Read control signal 211 (and wait for the memory interface controller 24 to indicate at 270 that the transaction has completed and the stack memory data is ready to be consumed); set up the input mux 25 to route the retrieved stack memory data to the A_data input of the RAM portion 26 and set the A_addr input to point to the location specified by "% reg", and assert the write enable (A we) to the RAM 26; and finally decrement the value at location SP in the RAM 26 by one and store it back at location SP. A similar description for the push macro would be: increment the RAM location referred to as SP by one; move the value at SP to the Address Register 28; move the value at the location specified by the "% reg" to the Data Register 29; and finally assert the Write control signal 212 (and wait for the memory interface controller 24 to indicate at 270 that the transaction has completed).

For the add macro, the first operation results in the microcode inputting two addends to the ALU portion 27 of FIG. 2, the second operation results in the microcode causing the ALU portion to add its two inputs, and the third operation results in the microcode routing the output produced by the ALU portion to a desired storage location. The following is a block of microcode source code, defined using the foregoing macros, that implements the iadd bytecode from the JAVA™ specification:

BYTECODE.iadd:
   pop(T1)
   pop(T2)
   add(T1, T2, T3)
   push(T3).

The JAVA™ bytecodes specification does not specify what should be done regarding data residing on the stack as it is popped off. In most applications, as the data is popped off the stack, a copy of that data remains in the stack memory, and the stack address is manipulated to point to the next stack location. For a more secure application, the pop macro shown above could be modified to overwrite the data in the stack memory with zeros before moving the stack address. As a result, whenever data is popped off the stack, the memory location will automatically be cleared. It can therefore be seen that, once the basic functionality of a bytecode (for example, the iadd bytecode functionality of popping two values off the stack, adding them together, and pushing the result back onto the stack) is implemented in microcode, the developer can modify (e.g., enhance) that functionality as desired, for example, to incorporate security/safety enhancements or other kinds of extensions (such as modifying the pop macro shown above to perform the aforementioned zero overwriting), without changing the underlying semantics of the bytecode.

A similar problem exists for the data contained in stack frames when methods return. In some embodiments, JAVA™ bytecode functionality is enhanced by suitably designing the microcode such that, whenever a method returns, the data in the associated stack frame is overwritten with zeros.

Standard JAVA™ is intended to be platform independent. The core JAVA™ language therefore has no capability of directly interfacing with platform-specific resources such as low-level hardware or an operating system. In JAVA™, native methods provide a mechanism to link in low-level code (e.g., code written in a language like C) to a JAVA™ application. This linked-in code can access hardware, for example, display adapters, network interfaces, etc., or interact with an operating system to request and use resources. Native method calls thus present the user, at the JAVA™ application code level, with methods that provide access to platform-specific resources such as mentioned above. In this way, the majority of the JAVA™ code maintains its platform independence, with platform-specific operations relegated to a typically small collection of native methods.

As described in detail further hereinbelow, some embodiments can provide direct access to all of the platform specific resources required to support JAVA™ source code. This eliminates the need to use the native method feature of JAVA™ to access platform-specific resources. Instead, native methods are used to permit the developer to call, directly from JAVA™ application source code, a subroutine written in microcode (also referred to herein as a microcode subroutine). In various embodiments, native methods are used to call microcode subroutines to test, verify, or control bytecode functionalities that have been enhanced for security/safety purposes as described above. For example, in some embodiments, the JAVA™ source code uses a native method that can, at any time, call a suitable subroutine, implemented by microcode instructions, to test, verify, or control the operation of a pop macro having the aforementioned zero overwriting feature. Because a native method is used to call a subroutine that is implemented by microcode instructions, this test/verify/control capability can be implemented to any degree of complexity desired by the developer.

Some embodiments use one or more native methods and the respectively associated microcode subroutine(s) to access a complex function that is implemented in hardware. Some embodiments code a complex function directly as a microcode subroutine, and access the microcode subroutine via a native method call. Some embodiments use native methods both to access functions implemented in hardware and to access functions coded directly as microcode subroutines. Some embodiments implement a function by coding the main algorithm as a microcode subroutine, providing one or more helper functions in hardware, and accessing both the microcode subroutine and the helper function(s) via native method calls. For example, a helper function might be provided to relieve a specific performance bottleneck condition.

The above-described use of native methods enables the developer to build an application that goes as far as desired beyond what could otherwise be accomplished with just hardware alone or software alone. In effect, this seamlessly extends (as far as desired) the definition of what happens when a JAVA™ application is executed, without changing the semantics of executing the JAVA™ code.

Referring again to FIG. 2, the ROM portion 21 contains program instructions that are used by the microcode address generation portion 201 to produce microcode addresses for the microcode table 203. The content of the ROM portion 21 is binary, and is referred to herein as the ROM image. In some embodiments, a JAVA™ class loader 37 of FIG. 3 produces an executable ROM image 301 as shown in FIG. 3, based on JAVA™ class files 38 compiled at 39 from JAVA™ application source code designated at 300. The ROM image 301 thus contains program instructions, in the form of JAVA™ bytecode instructions, in the example of FIG. 3. The class loader 37 is implemented by JAVA™ class files 302 compiled at 303 from JAVA™ class loader source code 304. A detailed explanation of the design and operation of a JAVA™ class loader is presented in *Inside the JAVA™ 2 Virtual Machine* (Second Edition), by Bill Venners (Tata McGraw-Hill, 1999), which is incorporated herein by reference. Appendix III contains a description of an example of the class loader 37 utilized by some embodiments.

Figure 4:
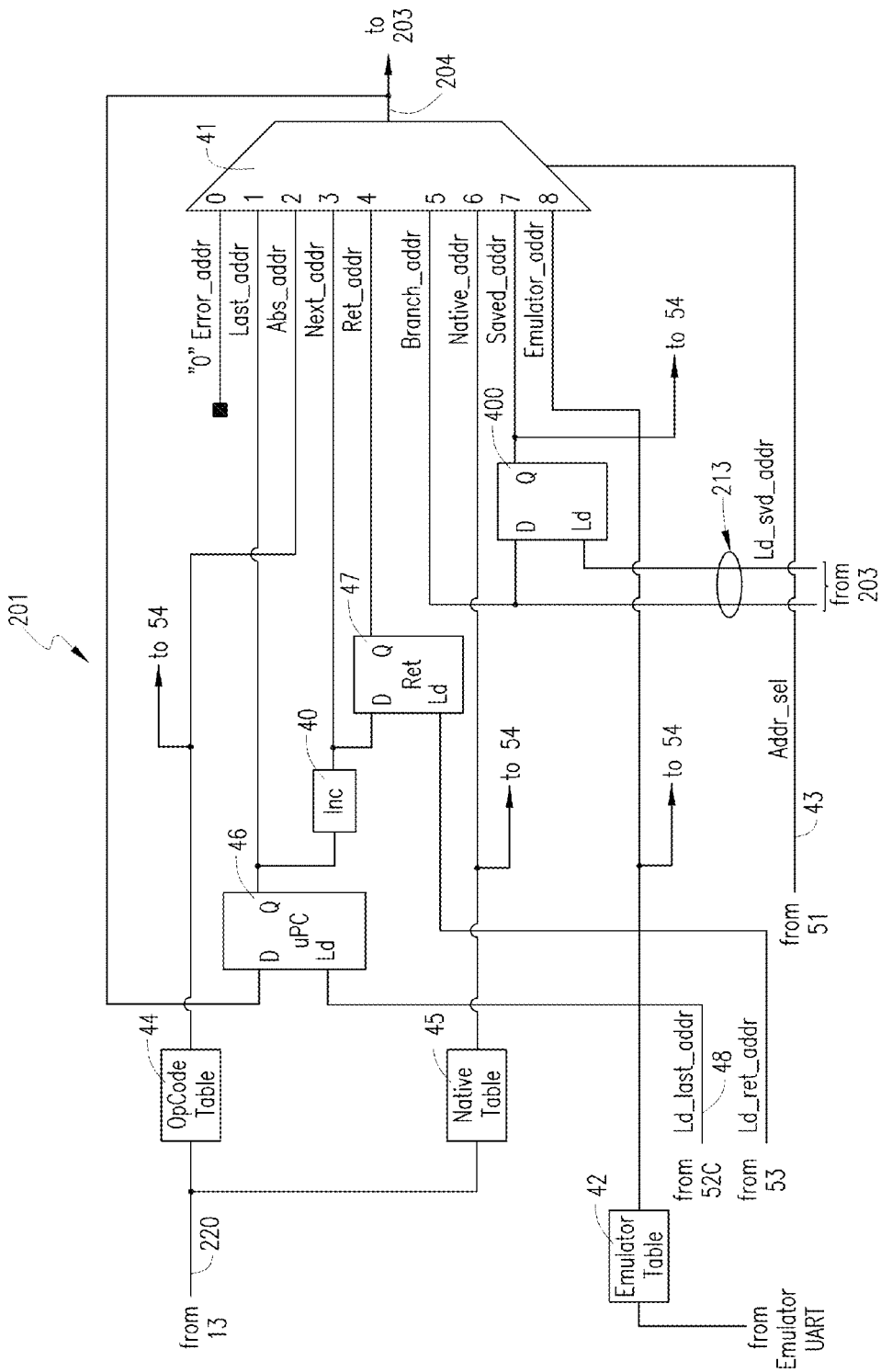
FIG. 4 diagrammatically illustrates the microcode address generator of FIG. 2 in more detail according to exemplary embodiments of the invention.

FIG. 4 diagrammatically illustrates the microcode address generation portion 201 of FIG. 2 according to exemplary embodiments of the invention. As indicated above, the primary purpose of the IEC 11 is to generate a new microcode instruction on every clock cycle. The microcode address generation portion 201 provides the address of that instruction at 204 (see also FIG. 2). There are several sources for the address 204 which, as shown in FIG. 4, is selected by a multiplexer 41 under control of an Addr_sel signal 43. An Absolute Address (Abs_addr) is obtained from the Opcode Table 44, which translates a JAVA™ bytecode, from the ROM image 301 in the program ROM 21 (see also FIGS. 2 and 3), into a microcode address. A Native Address (Native_addr) is obtained from a Native Table 45, which translates a native method index value (from the Constant Pool in the ROM 21) into a microcode address. An Emulator Address (Emulator_addr) is obtained from an Emulator Table 42, which translates a command value received from the emulator UART into a microcode address. A Last Address (Last_addr) points to an instruction that causes execution to stay at the same address while waiting for an indication that some external operation has completed. Last Address is provided by a micro Program Counter (uPC) register 46 whose address input is the current microcode address 204, and whose load input is a ld_last_addr signal provided by the sequencer logic portion 202. A Next Address (Next_addr) is the next sequential address, provided at 40 by incrementing Last Address. A Return Address (Ret_addr) is the address when returning from a microcode subroutine. Return Address is provided by a Return Address register (RET) 47 whose address input is Next Address, and whose load input is a ld_ret_addr signal provided by sequencer logic portion 202. A Branch Address (Branch_addr) is an address field specified in the microcode instruction at 213 and used to perform branching operations. A Saved Address (Saved_addr) is provided by a Saved Address register 400 whose address input is Branch_addr, and whose load input (Ld_svd_addr) is provided by the microcode instruction at 213. This register 400 stores Branch_addr for later use as a type of branch capability.

The Opcode Table 44 is built from information provided by the microcode assembler 32 of FIG. 3. Each bytecode in the ROM image 301 has a unique 8-bit value (provided in the class files 38 by the compiler 39 of FIG. 3), and an associated symbolic name. In some embodiments, the Opcode Table 44 is a look-up table that uses the 8-bit value of each bytecode (received at 220 from ROM 21) to look up the start address of the microcode instructions that support the functionality for that bytecode. The microcode assembler 32 generates an output file, LabelAddressTable, that associates the aforementioned 8-bit values of all supported bytecode implementations with their corresponding start addresses in the microcode. The Opcode Table 44 can be viewed as an array of microcode addresses, and the 8-bit bytecode value as the index into that array. Thus the Opcode Table is used as a look-up table that translates bytecode values from the ROM image into corresponding microcode start addresses.

The Opcode Table 44 is constructed in some embodiments by searching the Label Address Table for labels that have a "BYTECODE." prefix and a corresponding JVM defined symbolic bytecode name. For each label identified in the search, the associated microcode start address value from the Label Address Table is inserted at an appropriate location in the Opcode Table. The location in the table is determined by the value assigned to the bytecode name as defined by the JVM specification. The Opcode Table is built in ascending bytecode order, starting at 0. For example, the first bytecode value of zero (0) is assigned to the bytecode named nop. Therefore the first location in the table (at location 0) is assigned the value of the microcode address associated with the label in the LabelAddressTable that is named BYTECODE.nop. If there is no associated label in the LabelAddressTable, the corresponding Opcode Table location is filled with the address of a microcode error routine that handles unimplemented bytecodes in an implementation dependent way. The use of the "BYTECODE." prefix in microcode labels is by convention only and not required or enforced by the assembler. This prefix convention permits humans and/or software programs to easily extract pertinent information about specific microcode labels. Thus, the Opcode Table may be generated according to the procedure described above, which procedure may be executed manually by inspection of the Label Address Table, or by automatic code generation.

One of the sections of the ROM Image contains a resolved Constant Pool for the application program contained in that ROM Image. The Constant Pool is itself made up of a large number of subsections that provide information needed in the execution of various types of JAVA™ bytecodes. The use of the Constant Pool to support JAVA™ bytecode execution is well known. Several of the Constant Pool subsections are used conventionally in the invocation of JAVA™ methods, specifically by the invoke bytecodes. These invoke type Constant Pool subsections conventionally contain several fields, two of which are the PC (Program Counter) value and the Native Index value. The PC value is the address in the ROM of the first bytecode of the associated JAVA™ method. Because the first few sections in the ROM contain initialization information that the microcode uses to initialize the core and to check the integrity of the ROM, there will never be any JAVA™ bytecodes placed at address zero in the ROM. Therefore, some embodiments use a value of zero in the PC field to indicate to the IEC (see also FIG. 1) that the method is a Native Method, which means that it is a special microcode subroutine.

In JAVA™, a Native Method is a subroutine that is outside the confines of the JVM. There are no JAVA™ bytecodes associated with it, but rather it is executed in the native language of the processor. Conventional Native Methods are typically written in C or the like and compiled into the machine language of the processor the JVM is running on, providing access to operating system services like network communication, display adapter access, and other types of services that the JVM does not provide. In the data processing apparatus of FIG. 1, the native language is microcode and Native Methods provide a controlled access from JAVA™ to the inner workings of the processor via microcode subroutines. In the microcode source code, those subroutines associated with native methods are (in some embodiments) distinguished from other microcode subroutines by a naming convention whereby the subroutine name contains a special prefix that identifies it as a Native Method.

In an invoke type Constant Pool subsection with a PC value of zero, the Native Index will contain a non-zero value. In subsections with a non-zero PC value, the Native Index is typically set to zero. The Class Loader 37 (see also FIG. 3) is responsible for constructing the ROM Image and therefore also responsible for assigning appropriate Native Index values. While the process for establishing how the Native Index values are determined is implementation dependent, the Native Index values computed by the Class Loader must be consistent with the way in which the Native Table 45 is constructed. The entries in the aforementioned Label Address Table are provided by the microcode assembler in order of ascending microcode address. In some embodiments, the Class Loader searches the Label Address Table in ascending microcode address order for entries having labels that contain the aforementioned special prefix (for Native Method). The sequence in which the entries with the special prefix are encountered is used to assign sequentially ascending index values to the respective labels, starting with 1 for the entry encountered first, and counting upwardly. The corresponding relationship between the sequence of index values and the labels encountered in the Label Address Table having the special Native prefix is stored in a data structure within the Class Loader, allowing the Class Loader to search through the label names and retrieve their associated index values.

As the Class Loader processes each method it fills in information about that method. If the method was declared as native, then the Class Loader sets the PC field to zero and uses an identifying label from that method's signature to search the aforementioned data structure for a matching label. If the Class Loader finds a match, it then retrieves the associated index value from the data structure, and writes that retrieved index value into the Native Index field in the Constant Pool entry for that method.

The Native Table 45 is a simple look-up table that translates a Native Index into a microcode address. The first step in building a Native Table is to search the Label Address Table, in ascending address order, for entries having labels that contain the special native prefix. A list of these labels is constructed in exactly the same way as described above, with a sequence of labels and their associated addresses listed in the order that they were encountered. The first address in the list is written into the Native Table at location 1, the second address at location 2, and so on. The locations to which the microcode addresses are written in the Native Table correspond to the values in the Native Index fields of the corresponding Constant Pool entries. The first location in the table, location 0, always contains the address of an error handler subroutine to ensure that an error in the Class Loader does not propagate to an uncaught error at run-time.

In some embodiments, the Emulator Table 42 is produced in similar fashion to the Native Table 45, except that the index values are derived from implementation defined Emulator Command values that are associated with unique emulator support routines written in the microcode, and there is no involvement by the Class Loader. Emulator Command labels in the LabelAddressTable utilize an "EMULATOR." prefix to facilitate human and/or software program index extraction. In some embodiments, unused locations in the Emulator Table 42 are filled with an implementation dependent microcode error address.

When the IEC 11 encounters one of the invoke bytecodes (the bytecode equivalent of a method call) with a pc start value of zero in its Constant Pool entry, it knows that this method is a native method and ensures that the associated native index value from that Constant Pool entry is input to the Native Table 45. That index value on the Native Table input selects the appropriate microcode start address from the Native Table. Microcode assertion of the Ntv_address input of logic 54 (see also FIGS. 5 and 6) causes the address selected from the Native Table 45 to be routed to the microcode address 204 via the multiplexer 41. The microcode branches to the first microcode instruction of the native method while saving its return address in the return register 47. When the native method returns, normal bytecode fetch and execute processing resumes.

The Saved Address Register 400 is used to perform delayed branching. The Ld_svd_addr field in the microcode instruction loads the Branch Address field in the Saved Address Register in order to use that address for a branch target at a later time. This capability has may uses in optimizing and improving microcode size and/or performance. In some embodiments, there is considerable similarity in the way several bytecodes are executed with a small amount of uniqueness for each one. For example, there might be some similar initial setup, some unique processing, and then some similar cleanup. In some embodiments, each of several different bytecodes calls the initial setup subroutine, and stores the address of the cleanup routine in the Saved Address Register 400 as part of its instructions. When the subroutine returns, each bytecode executes its unique processing and then, the last thing it does is branch to the Saved Address stored in the Saved Address Register 400 to perform the cleanup function. As with the subroutine call and return capability, and used in conjunction with it, the Saved Address capability provides a mechanism for reusing microcode, reducing size, and improving performance.

Figure 5:
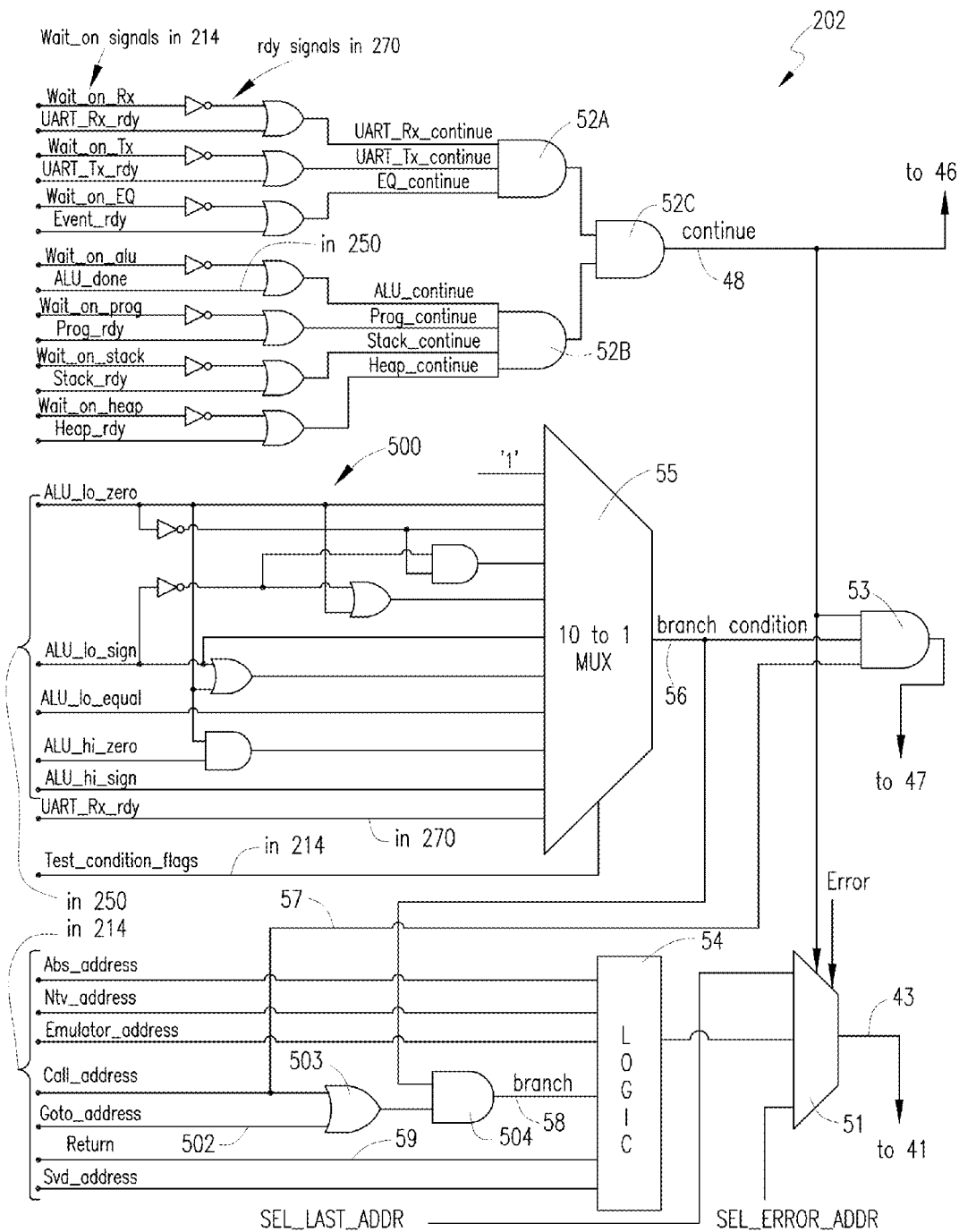
FIG. 5 diagrammatically illustrates the sequencer logic of FIG. 2 in more detail according to exemplary embodiments of the invention.

FIG. 5 diagrammatically illustrates the sequencer logic portion 202 of FIG. 2 according to exemplary embodiments of the invention. Once the microcode has finished its initial startup duties associated with checking and initializing the state of the application, it is ready to start executing bytecodes. Information contained in the program ROM 21 (see also FIG. 2) indicates the location of the first bytecode, and the microcode will execute a program memory read from that location. One of the signals set to its active state in the instruction that performs the memory read is wait_on_prog, as shown in the upper left of FIG. 5. As shown in FIG. 5, this and all of the "wait_on" signals are inverted and logically ORed with respectively corresponding awaited signals to form a continue signal for that function. All the continue signals are logically ANDed at 52A-52C to form a composite continue signal 48 that determines whether the microcode address should hold on the current address (i.e., Last_addr in register 46 of FIG. 4) or be allowed to advance.

Figure 6:
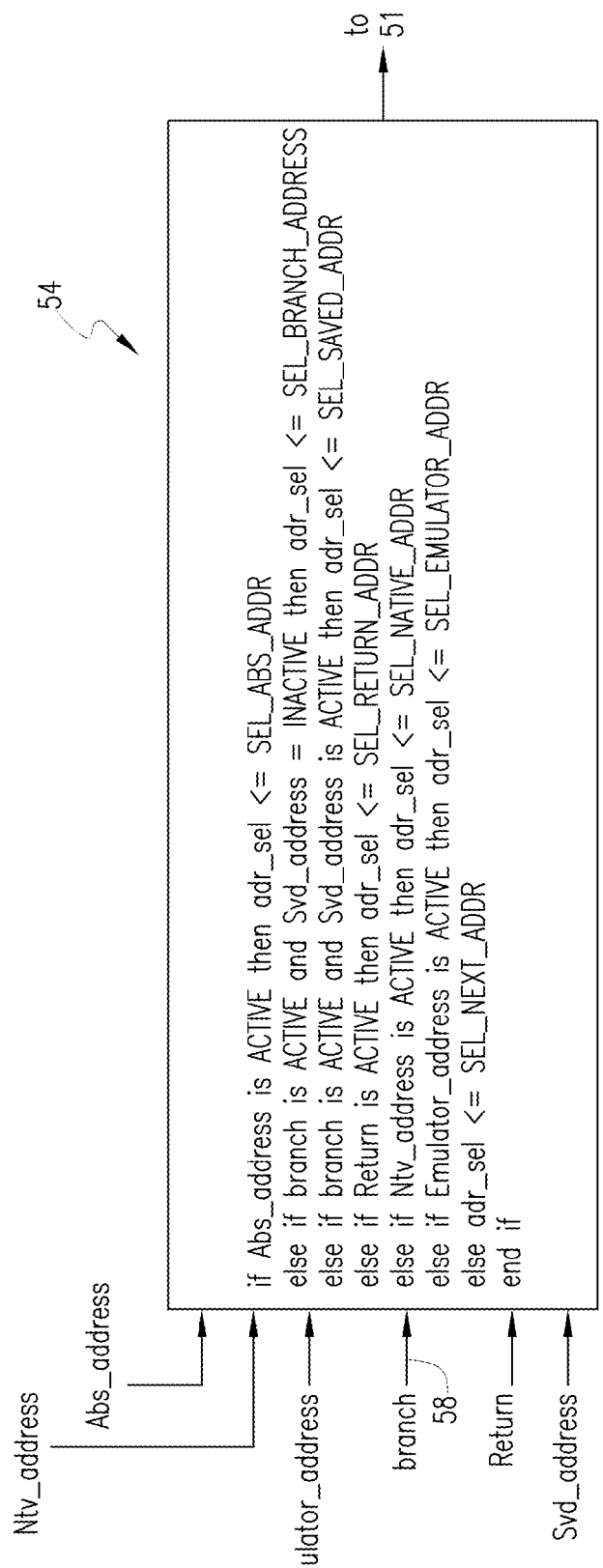
FIG. 6 diagrammatically illustrates the functionality of logic in FIG. 5 according to exemplary embodiments of the invention.

While prog_rdy remains inactive low, with wait_on_prog active high, prog_continue is low in FIG. 5, which in turn causes continue 48 to go low, which causes the microcode address to hold on the current location. When the program memory transaction completes and prog_rdy goes high, it will propagate through AND gates 52A-52C to cause continue 48 to go high. Accordingly, the microcode address will now be determined by logic 54, whose output is selected by the continue signal 48 via selector (e.g., multiplexer) 51. Because it is initially desired to start executing the first bytecode, the Abs_address field in the next instruction word (received by logic 54 in FIG. 5) is active. As shown in FIG. 6, the logic 54 will signal the multiplexer 41 of FIG. 4, via the selector 51 of FIG. 5, to select the Abs_addr provided by Opcode Table 44.

The continue signal 48 in FIG. 5 directly drives the Ld_last_addr signal in FIG. 4, which is used to load the uPC register 46, which holds the Last address value. On each clock cycle that continue is enabled (high) the uPC register will be loaded with the current microcode address 204. Whenever continue becomes disabled (low) then the selector 51 is configured to output the SEL_LAST_ADDR value on Addr_sel 43, causing the output of the uPC register to be used as the microcode address, thus the microcode will wait at the current microcode instruction until continue is again enabled. In some embodiments, the awaited signals include: receiver and transmitter ready signals UART_Tx_rdy and UART_Rx_rdy of the emulator UART; a signal Event_rdy indicating that at least one event is present in the Event Queue for I/O module interactions; a signal ALU_done indicating that the ALU has finished a requested operation; and signals Prog_rdy, stack_rdy and heap_rdy, which respectively indicate that the ROM 21, stack 23 and heap 22 have finished a transaction.

Condition flags shown in FIG. 5 (and fed through combinational logic 500 to multiplexer 55) provide a means for testing conditions about the receiver ready flag in the emulator UART and data stored in the input registers of the ALU. Specific information regarding the value stored in the ALU input register, for example, whether or not the value is equal to zero (see ALU_lo_zero and ALU_hi_zero in FIG. 5), or the value of the sign bit (see ALU_lo_sign and ALU_hi_sign in FIG. 5), are decoded by the logic 500 and provided as inputs to the multiplexer 55. A field in the microcode, Test_condition_flags, selects which condition (including an always true condition "1"), is to be output from the multiplexer 55 as branch_condition signal 56. This configuration corresponds to a branch-if-true convention for writing microcode. A slightly different configuration where the output of the test condition mux 55 is inverted and the value of the always true condition is changed to "0" will provide a branch-if-false microcode convention. In some embodiments a branch-if-false convention can produce a smaller (shorter) microcode table than the equivalent branch-if-true convention. For the remainder of this specification a branch-if-true configuration will be assumed because it is more intuitive. However, it should be understood that an equivalent branch-if-false configuration may be used in alternate embodiments.

The branch condition signal 56 is used to perform conditional tests that are used in high-level programming constructs such as if-then-else and while and for loops, in addition to conditional subroutine calls and returns by combining branch_condition 56 with Call_address 57 or Goto_address 502 signals in the microcode instruction, where the Call_address signal 57 indicates that the branch address (Branch address in FIG. 4) is to be used as a conditional subroutine call or the Goto_address signal 502 is to be used as a conditional goto. While these conditional branching mechanisms share a common thread as to determining whether the branch should be taken, the conditional subroutine call incorporates several additional mechanisms to achieve this particular capability. If branch_condition 56 is high when Call_address 57 and continue 48 are high, then Next address (Next_addr) will be saved in the Return Address Register 47 (FIG. 4) because the Ld_ret_addr signal will be asserted by operation of AND gate 53. If the svd_address signal is inactive, then execution will branch to the address contained in the Branch_addr field of the microcode because Branch_addr will be selected at 41 by the Addr_sel signal 43, due to the branch signal 58 of FIG. 5 being active to drive operation of logic 54 (see also FIG. 6). At the end of the subroutine the Return signal 59 is set to active, and logic 54 (see also FIG. 6) determines that the Return Address should be used for the microcode address, whereupon execution returns to where it left off.

In general, the mechanism by which a conditional branch is taken is the same regardless of the kind of branching operation that has been requested. If either the Call_address or Goto_address signals 57 or 502 are set active in an instruction, this also indicates that the Branch_addr field is to be used for the next address. The state of the branch_condition signal 56 will control (via AND gate 504) whether or not the call or goto occurs. If the condition selected by the Test_condition_flags field is false, then branch_condition 56 will be low, so the branch signal 58 will remain low even though Call_address or Goto_address are active high. Therefore, if the condition is false, the branch will not occur, and, in the event of a call, the return address will not be saved, and instead the next address will be executed.

As mentioned above, some embodiments provide direct access to all platform specific resources required to support JAVA™ source code, thereby eliminating the conventional need to use the JAVA™ native method feature to access platform-specific resources, and permitting uses of native methods such as described above. These embodiments incorporate support for two new bytecode instructions, newio and newioarray, in order to support Object Oriented I/O (OOIO), a mechanism with which all I/O modules are mapped into the heap portion 22 of the memory arrangement 13, and are accessed as ordinary JAVA™ objects. From the software viewpoint there is no difference between normal objects and I/O devices except that I/O devices have some additional information provided through JAVA™ annotations when their classes are declared. From a hardware designers viewpoint there are several additional registers to account for in order to support OOIO, but these registers are actually instantiated in the Heap Bus infrastructure module and so only affect address decoding.

From the microcode writer's viewpoint, as seen in terms of a JVM implementation, these extra registers mirror the same information embedded in a normal JAVA™ object residing on the heap. In some embodiments this information includes a reference to the Method Area of the Class the I/O object belongs to and the size of the object, plus some event priority and enablement registers. Because these Object Oriented registers are common to all I/O devices in a system, in some embodiments those registers are encapsulated in a common location with their associated address decoding and read/write logic such that I/O device designers can be relieved of the burden of designing these registers into their devices. This also provides a means of supporting both legacy and commercial I/O designs that would not normally operate in an OOIO system. In these embodiments this encapsulating module is referred to as the Heap Bus module because it provides the control logic and routing for heap transactions to and from heap memory and the I/O devices, which share the heap address space in the system. In some embodiments the Heap Bus also encapsulates an Event Queue and related logic that replaces the more traditional, but less analyzable interrupt control logic. The Class Loader 37 uses the information contained in the annotations to map the fields within the I/O object to physical addresses in the I/O device hardware and, in the JAVA™ code where the I/O object is actually instantiated, it changes the standard JAVA™ bytecode instruction, new, to the new bytecode instruction, newio (and if needed it will change the standard bytecode instruction newarray to the new bytecode instruction newioarray).

In order to change an existing new bytecode into a newio bytecode, the Class Loader must keep a list of all the classes that have been declared to be associated with I/O devices via the annotations. When the Class Loader encounters the new bytecode in a sequence of bytecodes associated with a method, it must search this list to see if the object being created is of the same type as one of the designated I/O classes. To accomplish this it compares the fully qualified name contained in the Constant Pool entry for the new bytecode with each fully qualified name in its I/O class list and if it finds a match then it inserts the newio bytecode in place of the original new bytecode (fully qualified class names are defined in the JVM specification).

Further details about OOIO are provided in McCoy, "An Embedded System for Safe, Secure and Reliable Execution of High Consequence Software", which is incorporated herein by reference.

Although exemplary embodiments of the invention have been described above in detail, this does not limit the scope of the invention, which can be practiced in a variety of embodiments.

What is claimed is:

1. A method of providing programming for a data processor to execute a data processing application, comprising:
receiving microcode source code that defines one or more fields to be used by a microcode assembler to implement one or more user-defined microcode instructions; and
assembling, with a processor, the microcode source code, based on the one or more fields defined in the microcode source code, to produce microcode that includes digital microcode instructions for storage in a microcode instruction table with which to signal the data processor to execute digital microcode instructions for the user-defined microcode instructions from the table during execution of the data processing application.

2. The method of claim 1, wherein respective groups of said digital microcode instructions signal the data processor to execute respective data processing functions associated with respective bytecodes.

3. The method of claim 1, including receiving application source code associated with said data processing application, and producing program instructions based on the application source code, wherein said program instructions are indicative of respective groups of said digital microcode instructions.

4. The method of claim 3, wherein said application source code is platform-independent source code, said program instructions are bytecode instructions, and said groups of digital microcode instructions signal the data processor to execute data processing functions respectively associated with the respectively corresponding bytecode instructions.

5. The method of claim 3, wherein said producing program instructions includes receiving further application source code and producing the program instructions based on the application source code and the further application source code.

6. The method of claim 5, wherein one of said application source code and said further application source code is platform-independent source code.

7. The method of claim 6, wherein said further application source code is platform-independent source code.

8. The method of claim 7, wherein said application source code is platform-independent source code.

9. The method of claim 1, including receiving assembler source code, and compiling the assembler source code to produce compiled assembler code, wherein said assembling includes using the compiled assembler code to assemble the microcode source code and produce the microcode.

10. The method of claim 9, including receiving application source code associated with said data processing application, and producing program instructions based on the application source code, wherein said program instructions are indicative of respective groups of said digital microcode instructions.

11. The method of claim 10, wherein said producing program instructions includes providing further application source code and producing the program instructions based on the application source code and the further application source code.

12. An apparatus for providing programming for a data processor to execute a data processing application, comprising:
an input for receiving microcode source code that defines one or more fields to be used by a microcode assembler to implement one or more user-defined microcode instructions;
a memory to store the microcode source code; and
a microcode assembler coupled to said memory and input and configured to assemble the microcode source code, based on the one or more fields defined in the microcode source code, to produce microcode that includes digital microcode instructions for storage in a microcode instruction table with which to signal the data processor to execute digital microcode instructions for the user-defined microcode instructions from the table during execution of the data processing application.

13. The apparatus of claim 12, wherein respective groups of said digital microcode instructions signal the data processor to execute respective data processing functions associated with respective bytecodes.

14. The apparatus of claim 12, including a further input for receiving assembler source code, and a compiler coupled to said further input for compiling the assembler source code to produce compiled assembler code, wherein said microcode assembler is coupled to said compiler for using the compiled assembler code to assemble the microcode source code and produce the microcode.

15. A data processing apparatus, comprising:
a data processor; and
an input to receive microcode source code that defines one or more fields to be used by a microcode assembler to implement one or more user-defined microcode instructions;
a microcode memory coupled to said data processor and having stored therein digital microcode instructions in a microcode instruction table produced by assembling the microcode source code, based on the one or more fields defined in the microcode source code;
wherein said data processor is configured to execute digital microcode instructions from the microcode instruction table during execution of a data processing application in response to said digital microcode instructions for the user-defined microcode instructions.

16. The apparatus of claim 15, including an instruction memory having program instructions stored therein, and logic coupled between said instruction memory and said microcode memory for providing addresses to said microcode memory in response to said program instructions.

17. The apparatus of claim 16, wherein said logic includes a look-up table having said addresses stored therein.

18. The apparatus of claim 17, wherein said logic includes a plurality of look-up tables having addresses stored therein, and a selector having a plurality of inputs coupled to respective outputs of said look-up tables and having an output coupled to said microcode memory.

19. The apparatus of claim 16, wherein said program instructions include bytecode instructions that correspond to respective groups of said digital microcode instructions, and wherein said groups of digital microcode instructions signal said data processor to execute respective data processing functions associated with the respectively corresponding bytecode instructions.

20. The apparatus of claim 15, provided on a single integrated circuit.

* * * * *